US012529410B2

(12) United States Patent
Almheiri et al.

(10) Patent No.: US 12,529,410 B2
(45) Date of Patent: Jan. 20, 2026

(54) ZERO-FREQUENCY ABSORBER MATERIAL

(71) Applicant: Technology Innovation Institute—Sole Proprietorship LLC, Masdar (AE)

(72) Inventors: Mahra Almheiri, Abu Dhabi (AE); Chun Yu Lu, Abu Dhabi (AE); Tadzio Levato, Abu Dhabi (AE); Vincenzo Giannini, Abu Dhabi (AE)

(73) Assignee: Technology Innovation Institute—Sole Proprietorship LLC, Masdar (AE)

( * ) Notice: Subject to any disclaimer, the term of this patent is extended or adjusted under 35 U.S.C. 154(b) by 427 days.

(21) Appl. No.: 18/332,360

(22) Filed: Jun. 9, 2023

(65) Prior Publication Data

US 2023/0400085 A1 Dec. 14, 2023

Related U.S. Application Data

(60) Provisional application No. 63/366,169, filed on Jun. 10, 2022.

(51) Int. Cl.
*E04B 1/98* (2006.01)
*B82Y 30/00* (2011.01)
(Continued)

(52) U.S. Cl.
CPC ............ *F16F 15/08* (2013.01); *C09D 201/00* (2013.01)

(58) Field of Classification Search
CPC .. F16F 15/08; F16F 15/04; F16F 15/02; F16F 7/00; F16F 7/12; F16F 7/121; B63H 21/30; B63H 21/305; B82Y 30/00; B82Y 40/00; G10K 11/16; G10K 11/162; E04B 1/84; E04B 1/98; E04B 1/82; E04B 2001/8254; E04B 2001/8263; B60R 19/18; B60R 19/22; B60R 2019/1806; B60R 2019/1846; B60R 2019/186; B60R 2019/1866; B60R 2019/1873; B60R 2019/1893; F16S 5/00
See application file for complete search history.

(56) References Cited

U.S. PATENT DOCUMENTS 8,172,036 B2 * 5/2012 Tanielian ............. G10K 11/162
428/116
10,043,508 B2 * 8/2018 Park ....................... G10K 11/02
(Continued)

FOREIGN PATENT DOCUMENTS

CN 102748420 10/2012
CN 206799718 12/2017
(Continued)

OTHER PUBLICATIONS

International Search Report and Written Opinion for Application No. PCT/IB2023/055965, mailed on Sep. 28, 2023, 9 Pages.
(Continued)

*Primary Examiner* — Edgardo San Martin
(74) *Attorney, Agent, or Firm* — DLA Piper LLP (US)

(57) ABSTRACT

A structure may include a rotational element having a fixed central point and rotational freedom. A structure may include one or more branches connected to a tangent of the rotational element and extending outward therefrom, wherein the unit cell repeats throughout the structure; and wherein the unit cell allows rotational movement of the rotational element and prevents translational movement of the rotational element.

20 Claims, 10 Drawing Sheets

(51) Int. Cl.
*C09D 201/00* (2006.01)
*F16F 15/04* (2006.01)
*F16F 15/08* (2006.01)
*F16S 5/00* (2006.01)
*G10K 11/16* (2006.01)

(56) References Cited

U.S. PATENT DOCUMENTS

| | | | |
|---|---|---|---|
| 10,266,310 B2 * | 4/2019 | Li | B65D 39/12 |
| 10,458,501 B2 * | 10/2019 | Harne | F16F 7/108 |
| 10,767,032 B2 * | 9/2020 | Pasini | C08L 7/02 |
| 11,056,090 B2 * | 7/2021 | Martin | G10K 11/02 |
| 12,158,190 B2 * | 12/2024 | Harne | F16F 7/108 |

FOREIGN PATENT DOCUMENTS

| | | | | | |
|---|---|---|---|---|---|
| CN | 108481821 A | * | 9/2018 | | B32B 3/12 |
| CN | 108394135 B | * | 6/2019 | | B32B 3/12 |
| CN | 108962213 | | 8/2020 | | |
| CN | 111649097 | | 9/2020 | | |
| CN | 102020 | * | 10/2020 | | B60R 19/34 |
| CN | 111750018 | | 10/2020 | | |
| CN | 112045990 A | * | 12/2020 | | F16F 7/124 |
| CN | 112049886 | | 12/2020 | | |
| CN | 109854659 B | * | 3/2021 | | |
| CN | 113028267 A | * | 6/2021 | | B33Y 80/00 |
| CN | 214500859 U | * | 10/2021 | | |
| CN | 114261094 | | 4/2022 | | |
| CN | 115405644 A | * | 11/2022 | | G10K 11/162 |
| CN | 116292710 A | * | 6/2023 | | G16C 60/00 |
| CN | 117703980 A | * | 3/2024 | | F16S 5/00 |
| CN | 119289264 A | * | 1/2025 | | F16S 5/00 |
| WO | WO-2024047511 A1 | * | 3/2024 | | F16F 15/02 |

OTHER PUBLICATIONS

Baravelli E., et al., "Internally Resonating Lattices for Bandgap Generation and Low-Frequency Vibration Control," Journal of Sound and Vibration, vol. 332, No. 25, Dec. 2013, pp. 6562-6579.
Search Report of AE Application No. P6001433/2023, mailed May 29, 2024, 12 pages.

* cited by examiner

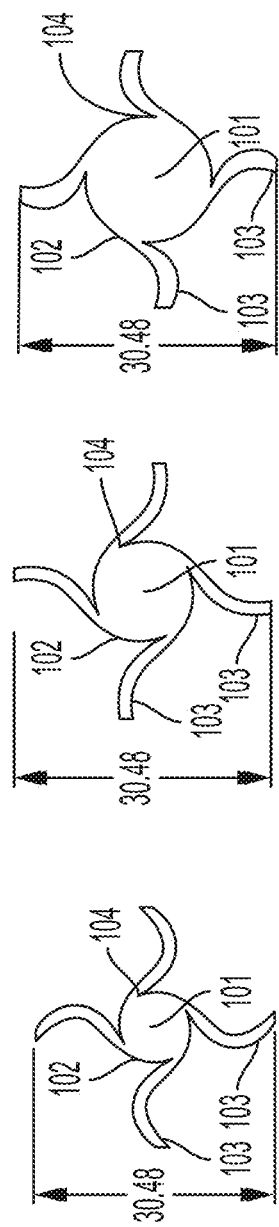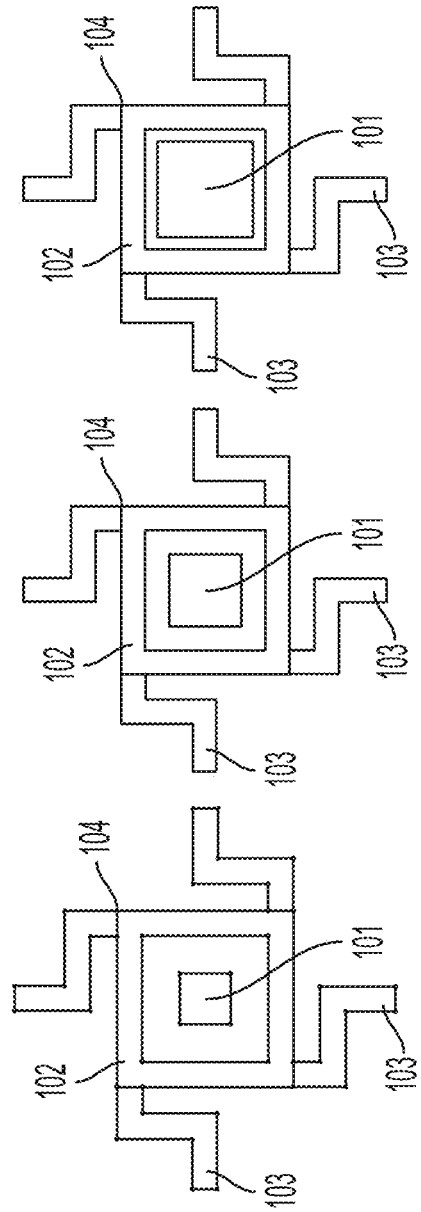

ZERO-FREQUENCY ABSORBER MATERIAL

CROSS-REFERENCE TO RELATED APPLICATIONS

This application claims priority to U.S. Provisional Application No. 63/366,169, filed on Jun. 10, 2022, which is hereby incorporated by reference in its entirety.

FIELD

The present disclosure relates generally to frequency absorption. More specifically, the present disclosure relates to structures having a particular unit cell design that allows for zero-frequency absorption.

BACKGROUND

Materials and structures that serve as frequency absorbers are utilized in the fields of construction, civil engineering, acoustics, and electronics, among others. These absorbers are found in insulation materials to prevent unwanted sound transfer, in vehicles to minimize noise from the road, and in liners for building materials to strengthen the buildings against earthquake damage. A particular example is the design of bridges to prevent damage to the bridge caused by the vibrations induced by use; vibration absorption provides stability and longevity to the structure. There are numerous applications for vibration and frequency absorbers and there is a need for absorbers that function effectively at all frequencies.

Broadband absorbers, which function across all frequencies, have been produced, though it is well understood in the art that low frequencies are the most difficult to effectively absorb. As the frequency approaches zero, the materials traditionally used are undesirably large and heavy. This leaves limited options for the effective absorption of near-zero frequencies, which are particularly relevant to complete soundproofing and earthquake safeguards.

Metamaterials are artificial structures with repeating subunits and have been investigated in recent studies for controlling wave propagation; as such, they are attractive candidates for frequency absorbers. It is possible to isolate vibration in metamaterials within a certain frequency range; vibration within the selected frequency range is known as the band gap. Absorbers that function in low frequency regimes are known, but materials which effectively permit true zero-frequency absorption have yet to be realized.

SUMMARY

In some embodiments, there is provided a structure for zero-frequency absorption including a unit cell formed from an elastic material, wherein the unit cell includes: a rotational element having a fixed central point and rotational freedom; and one or more branches connected to a tangent of the rotational element and extending outward therefrom; wherein the unit cell repeats throughout the structure; and wherein the unit cell allows rotational movement of the rotational element and prevents translational movement of the rotational element.

In some embodiments, the rotational element includes a circle, an oval, a rectangle, or a triangle.

In some embodiments, the fixed central point according to any of the above embodiments includes a circle, an oval, a rectangle, or a triangle.

In some embodiments, the one or more branches according to any of the above embodiments are straight, curved, angled, or S-shaped.

In some embodiments, the structure according to any of the above embodiments includes at least nine unit cells arranged in a two-dimensional pattern.

In some embodiments, the structure according to any of the above embodiments includes at least twenty-five unit cells arranged in a two-dimensional pattern.

In some embodiments, the structure according to any of the above embodiments includes a plurality of unit cells, wherein the plurality of unit cells are arranged in a three-by-three or larger pattern.

In some embodiments, the structure according to any of the above embodiments includes a plurality of unit cells, wherein the plurality of unit cells are arranged in a five-by-five or larger pattern.

In some embodiments, the structure according to any of the above embodiments includes a plurality of unit cells, wherein the plurality of unit cells are arranged in a five-by-six or larger pattern.

In some embodiments, the elastic material according to any of the above embodiments includes polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

In some embodiments, the rotational element according to any of the above embodiments is about 0.01 mm to about 1 m at its widest point.

In some embodiments, the rotational element according to any of the above embodiments is about 0.1 mm to about 0.1 m at its widest point.

In some embodiments, the rotational element according to any of the above embodiments is about 1 mm to about 100 mm at its widest point.

In some embodiments, the one or more branches according to any of the above embodiments have a length of about 0.01 mm to about 1 m.

In some embodiments, the one or more branches according to any of the above embodiments have a length of about 0.1 mm to about 0.1 m.

In some embodiments, the one or more branches according to any of the above embodiments have a length of about 1 mm to about 100 mm.

In some embodiments, there is provided a structure for zero-frequency absorption including: a plurality of unit cells, each unit cell including a rotational element having a fixed central point and rotational freedom, and one or more branches connected to a tangent of the rotational element and extending outward therefrom, wherein the plurality of unit cells are connected by the one or more branches; and solid pins passing through the fixed central point of each of the plurality of unit cells.

In some embodiments, the structure further includes solid plates on either side of the structure which connect the solid pins.

In some embodiments, the structure according to any of the above embodiments is formed from polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

In some embodiments, the solid pins according to any of the above embodiments are formed from polyethylene terephthalate, polyvinyl chloride, polystyrene, acrylonitrile butadiene styrene, poly(methyl methacrylate) (PMMA), polyamide (PA), polyoxymethylene (POM), glass, fiberglass, sapphire, silicon, silicon carbide, carbon steel, steel, stainless steel, titanium, tungsten, aluminum, copper, brass, nickel, or combinations thereof.

DRAWINGS

Aspects, features, benefits, and advantages of the embodiments described herein will be apparent with regard to the following description, appended claims, and accompanying drawings where:

FIGS. 4A-4F show several examples of unit cell designs, according to some embodiments of the present disclosure. FIG. 4A, FIG. 4B, and FIG. 4C show a unit cell with a circular rotational element and S-shaped branches, wherein the size of the rotational element and the branches change. FIG. 4D, FIG. 4E, and FIG. 4F show a unit cell with a square rotational element, a square fixed central point, and angled branches, demonstrating that the fixed central point may be of various sizes.

Figure 5A:
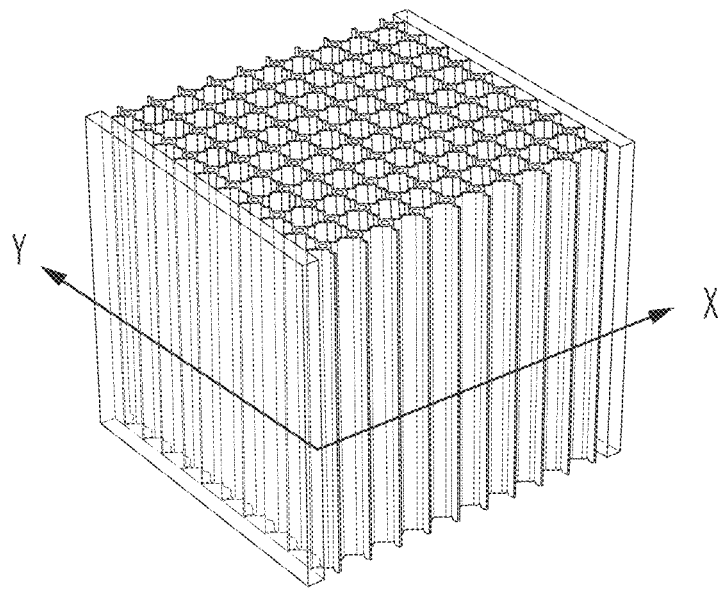
Figure 5B:
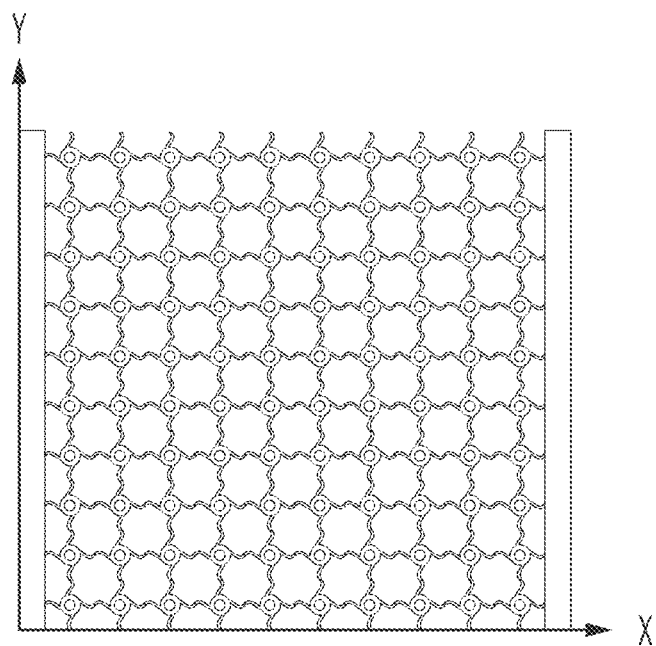

FIG. 5A depicts a three-dimensional, ten-by-ten design, from a perspective view, according to an embodiment of the present disclosure. FIG. 5B is a top-down view of the three-dimensional, ten-by-ten design, according to an embodiment of the present disclosure.

Figure 6:
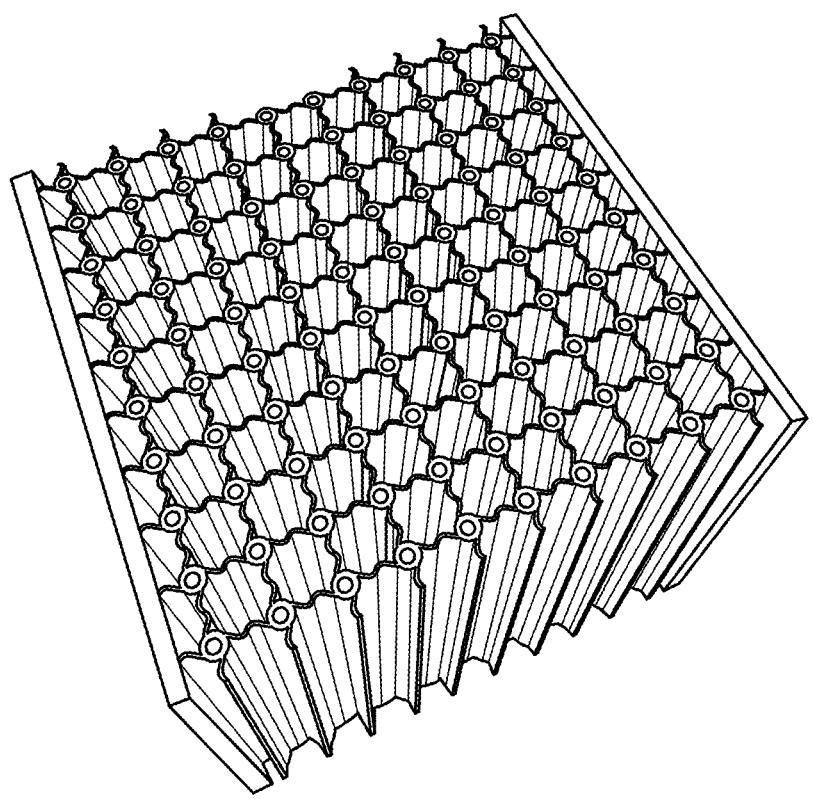

FIG. 6 is an image of a 3D-printed version of a ten-by-ten design showing that the two-dimensional design may be extruded outward to have depth such that the rotational element forms a tube or column and the branches form sheets, according to some embodiments of the present disclosure.

Figure 7:
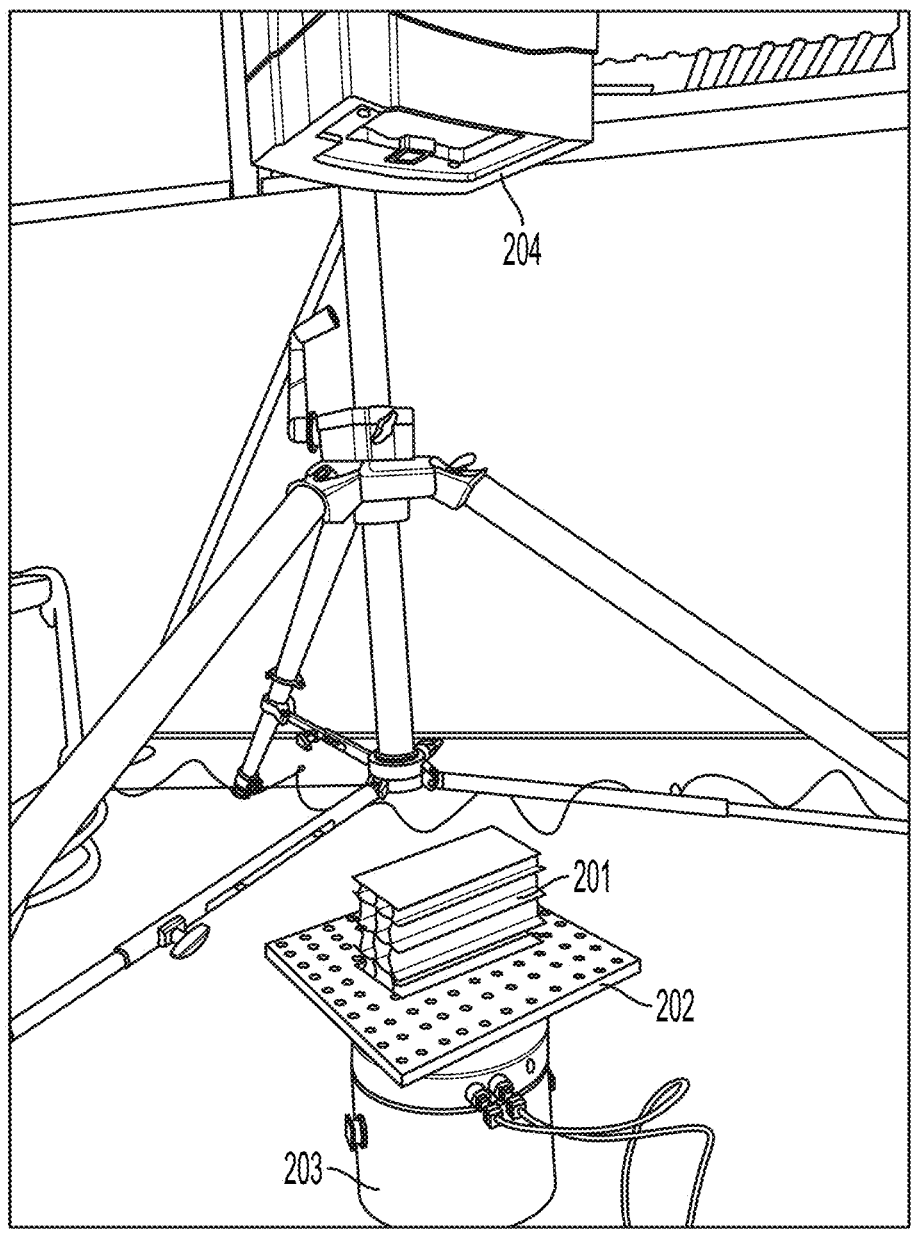

FIG. 7 is an image of an experimental setup for vibration measurements using a 3D-printed sample structure, according to some embodiments of the present disclosure.

Figure 8:
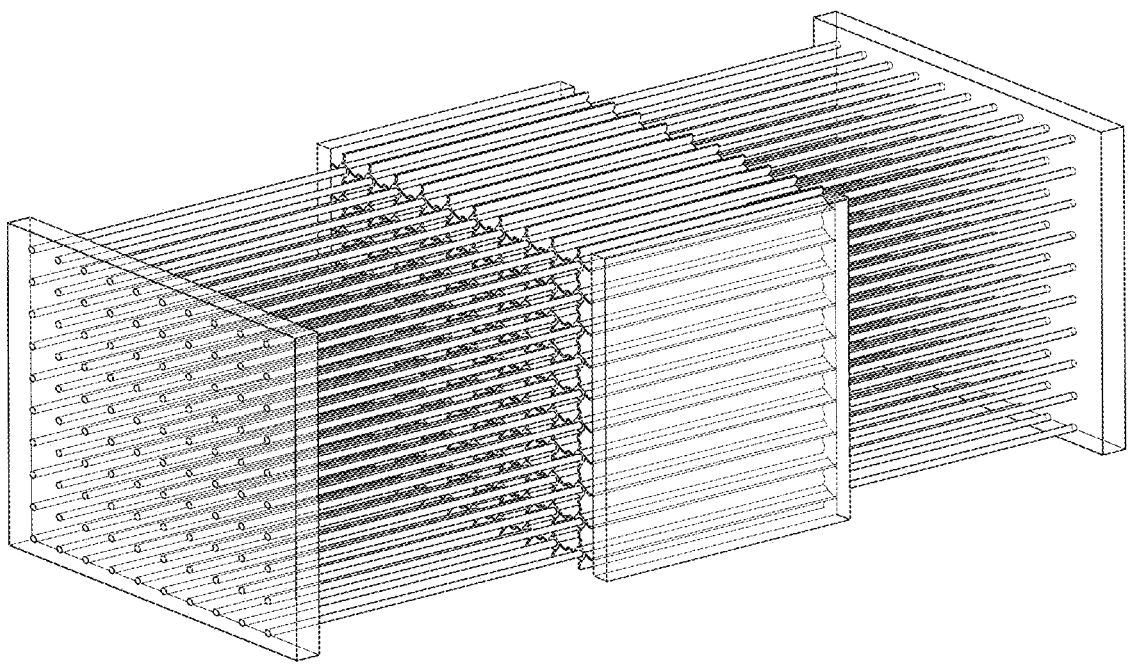

FIG. 8 depicts a three-dimensional design having solid pins through each of the central points of the structure, according to some embodiments of the present disclosure.

Figure 9:
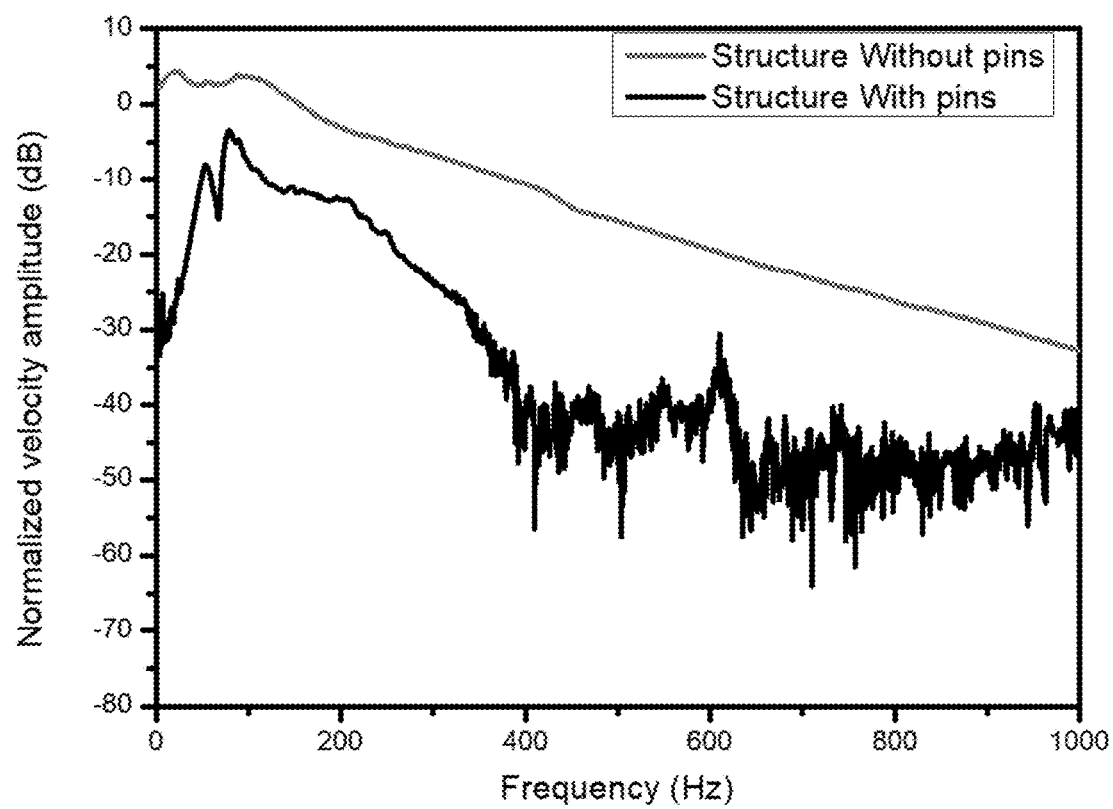

FIG. 9 is a graph illustrating the performance of a zero-frequency absorber, according to embodiments of the present disclosure, with and without solid pins.

Figure 10:
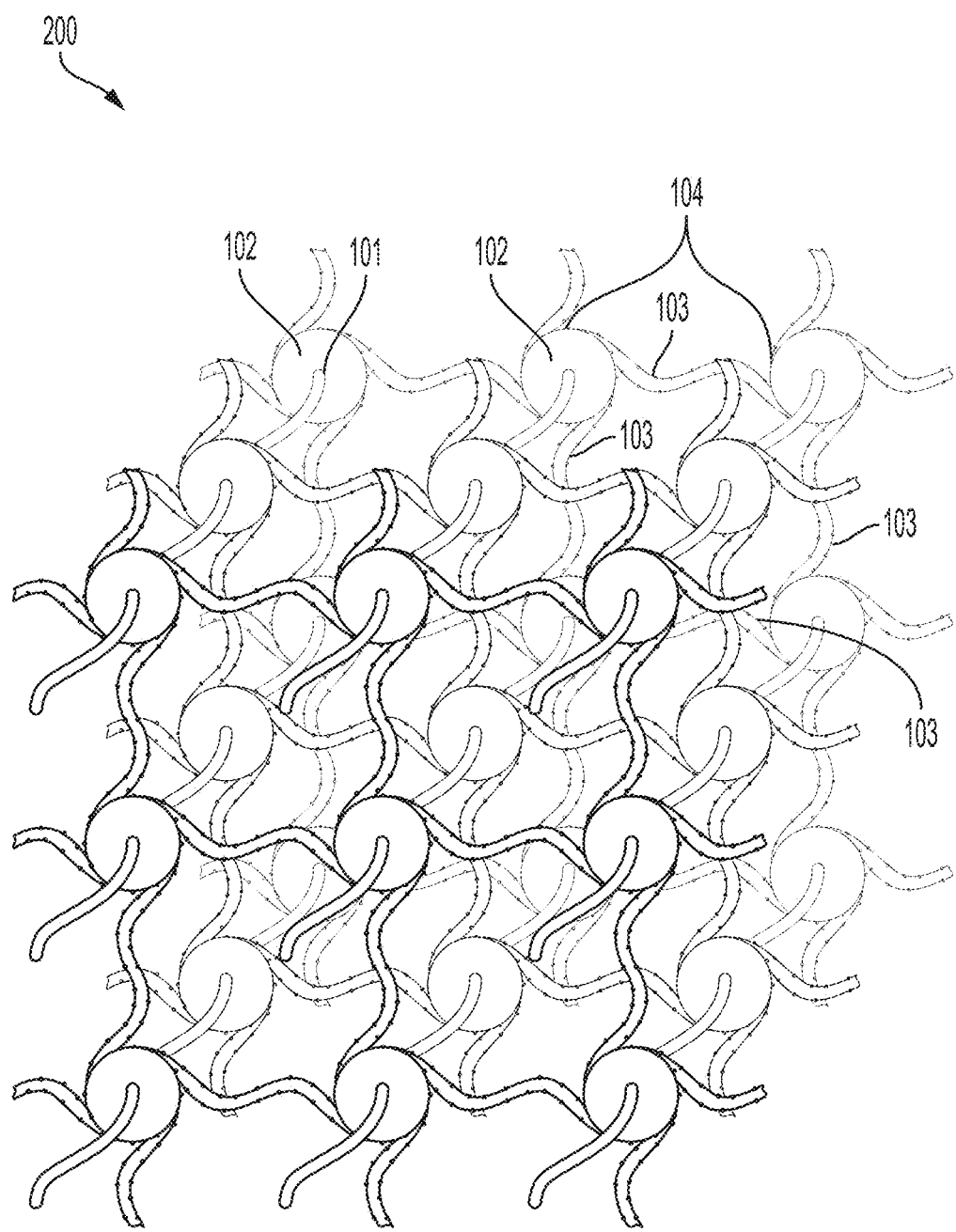

FIG. 10 depicts a structure having a three-by-three-by-three design, according to embodiments of the present disclosure.

DETAILED DESCRIPTION

While low-frequency absorber materials are known, there remains a need for effective zero-frequency absorbers that can be produced from lightweight materials. A structure having a particular unit cell design as described herein was developed through simulations using the Finite Element Method (FEM) conducted using commercially available COMSOL software. This method allows the approximation of partial differential equations using different types of discretizations, which may be customized based on the type of simulation required. The resulting unit cell design has a geometry that converts translational degrees of freedom to rotational degrees of freedom. A first aspect of the structures described herein is the connection of the translational components to the tangents of the rotational components. A second aspect of the structures described herein is to fix the center of the unit cell in order to reach the zero-frequency limit.

Figure 1:
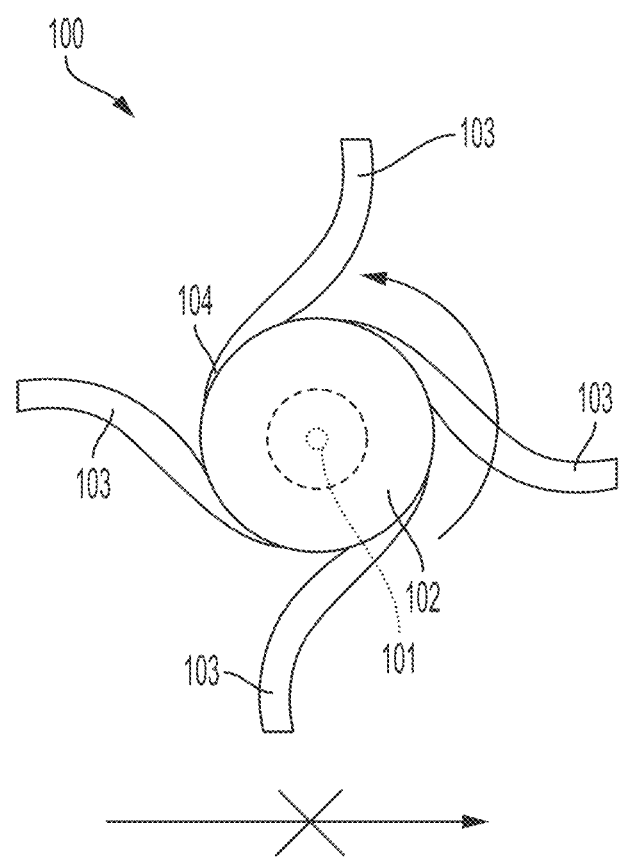
FIG. 1 shows the unit cell having a rotational element with a fixed central point and with branches extending outward therefrom and shows how the fixed central point may have rotational freedom of motion but not translational freedom of motion, according to some embodiments of the present disclosure.

In some embodiments, there is provided a structure for zero-frequency absorption which includes a unit cell having a translational element and a rotational element. An exemplary unit cell design is depicted in FIG. 1. The unit cell 100 may include a fixed central point 101, a rotational element 102, and one or more branches 103 which extend outward from the rotational element and are connected to a tangent of the rotational element 104. The fixed central point 101 allows the rotational element 102 to have rotational freedom of movement, but not translational freedom of movement. The fixation of the fixed central point 101 is what allows the unit cell 100 to reach the zero-frequency limit, without wishing to be bound by theory.

FIG. 1 further shows the connection of the branches 103 to the tangent of the rotational element 104, thus connecting the translational elements to the rotational element. The branches represent the translational elements of the structure. In this case, which is non-limiting, each rotational element 102 is connected to four branches 103.

Figure 2:
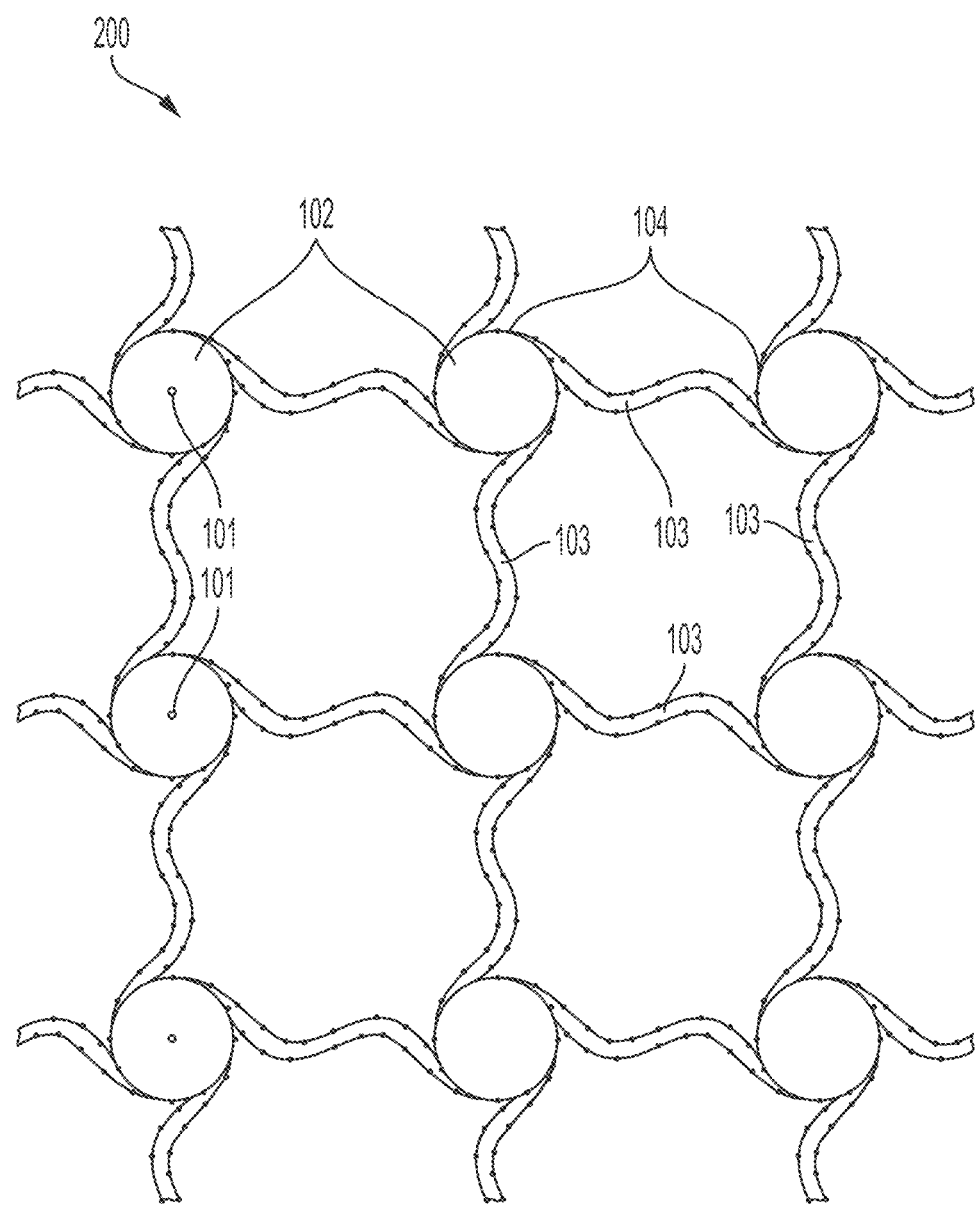
FIG. 2 shows the repeating arrangement of unit cells in a three-by-three pattern, according to some embodiments of the present disclosure.

As shown in FIG. 2, which shows a three-by-three structure with nine repeating unit cells, each unit cell containing a rotational element 102 that is connected to four individual branches 103, and a single branch is connected to two rotational elements and tangents thereof 104, according to aspects of the present disclosure. The fixed central point 101 in each unit cell allows each rotational element to rotate independently, while the curved nature of the branches allows the rotational motion to be absorbed with no translational motion of the rotational elements.

The unit cell design can include a fixed central point inside a rotational element. The fixed central point may be a circle, oval, square, rectangle, triangle, or other shape, and the rotational element may be a circle, oval, square, rectangle, triangle, or other shape. In some embodiments, the fixed central point is a point or center of a solid rotational element. In some embodiments, the fixed central point is a gap or opening in a rotational element, such that the rotational element forms a ring or otherwise hollow shape. The unit cell design can also include branches, which may be straight, angled, curved, S-shaped, or other shapes, as the translational components which are attached to and connect the rotational elements. In some embodiments, the design of the present disclosure allows rotational movement of the rotational element and prevents translational movement of the rotational element.

Figure 3:
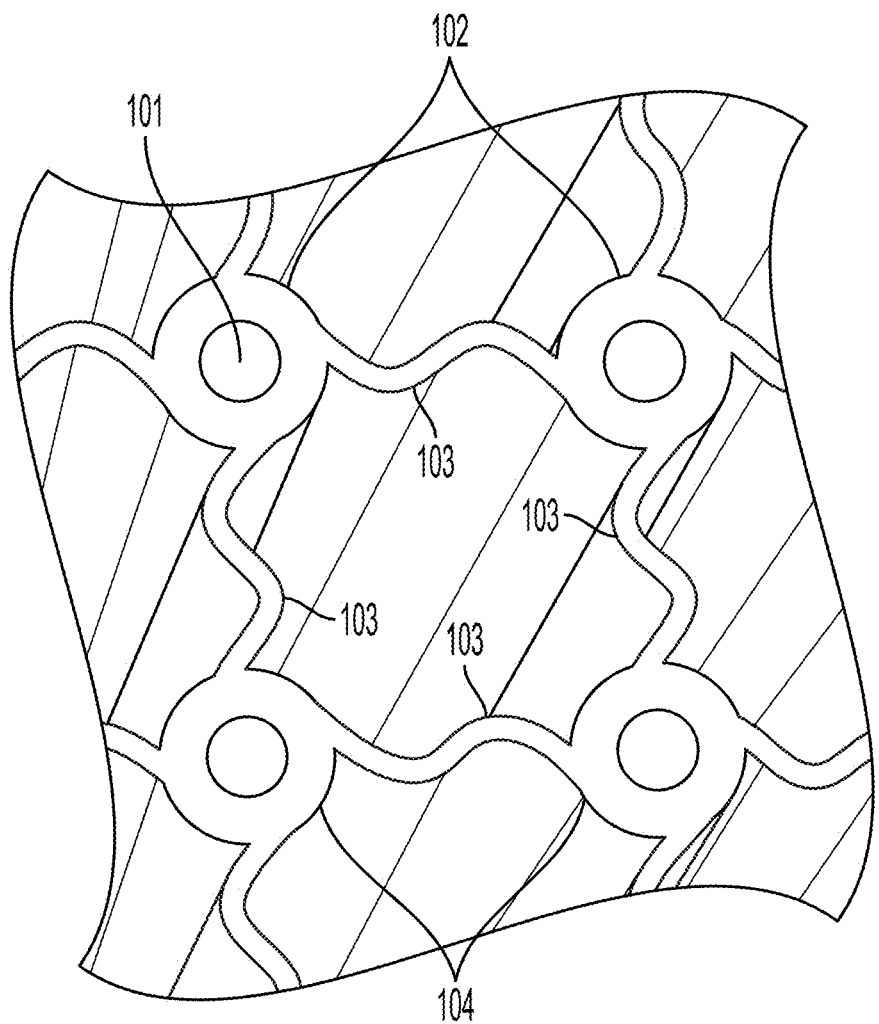
FIG. 3 is an image of a 3D-printed embodiment of the structure for zero-frequency absorption showing a close-up view of the unit cell design, according to some embodiments of the present disclosure.

FIG. 3 shows an image of an embodiment of the structure for zero-frequency absorption, showing a close-up view of the unit cell elements, according to aspects of the present disclosure. This image shows a 3D-printed structure having a unit cell design with a circular rotational element 102, circular fixed central point 101, and S-shaped branches 103.

In some embodiments, the unit cell may include a circular rotational element with a circular fixed central point and S-shaped branches, as shown in FIG. 4A-4C. FIG. 4A, FIG. 4B, and FIG. 4C show a unit cell with a circular rotational element 102 and S-shaped branches 103, wherein the size of the rotational element and the branches change. As shown, each of the unit cells illustrated in FIG. 4A, FIG. 4B, and FIG. 4C are depicted on the same scale of 30.48 mm. The rotational element 102 is shown to increase in size from FIG. 4A, FIG. 4B, to FIG. 4C, such that FIG. 4A depicts a unit cell with a smaller rotational element 102 than FIG. 4B and FIG. 4C, and FIG. 4C depicts a larger rotational element 102 than FIG. 4A and FIG. 4B. In FIGS. 4A-4C, the fixed central point 101 is depicted as a point within a solid rotational element 102, according to some embodiments of the present disclosure.

In some embodiments, the unit cell may include a square rotational element 102 with a square fixed central point 101 and angled branches 103, as shown in FIGS. 4A-4F. In other examples, the unit cell may include a circular rotational element with a square fixed central point and angled branches. Any combination of the above disclosed shapes is within the scope of this disclosure, provided that the unit cell has a rotational element with a fixed central point and branches connected thereto. The repeating pattern of the unit cell in the structure provides a material which is capable of zero-frequency absorption.

FIG. 4D shows a unit cell with a square rotational element, a square fixed central point, and angled branches and identifies the fixed central point 101, the rotational element 102, branches 103, and tangent of the rotational element 104. FIG. 4E and FIG. 4F also show a unit cell with a square rotational element, a square fixed central point, and angled branches, again identifying the fixed central point 101, the rotational element 102, branches 103, and tangent of the rotational element 104. The fixed central point 101 may include a point or center of a solid structure or may include a gap or opening. In FIGS. 4D-4F, the fixed central point 101 is depicted as a gap or hole within the rotational element 102, according to some embodiments of the present disclosure. As shown in FIG. 4D, FIG. 4E, and FIG. 4F, the fixed central point 101 may include a gap or opening of different sizes. The fixed central point 101 in FIG. 4D is depicted as an opening that is smaller than the fixed central point 101 in FIG. 4E and FIG. 4F. The opening, that is, the fixed central point 101, is larger in FIG. 4F than in FIG. 4D and FIG. 4E. The size of the fixed central point 101 relative to the size of the unit cell is not particularly limited.

In some embodiments, the unit cell is formed from an elastic material. The physical nature or composition of the elastic material used in the structure of the present disclosure is not particularly limited. The elastic material from which the unit cells of the structure are formed can provide the necessary elasticity and resilience for efficient vibration absorption. The elastic material used for the structure is not particularly limited and may be selected by a person of ordinary skill in the art based on the application in which the structure will be used. Skilled artisans will readily recognize numerous variations, modifications, and alternative configurations that are within the scope of the invention. In some embodiments, the Young's modulus of the elastic material may be about 1 MPa to about 100 MPa, such as about 1 MPa, about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, about 100 MPa, or any range or value contained therein. For example, highly elastic materials such as rubbers may be used, along with moderately elastic materials such as polymers and/or polymer foams. Moderately to slightly elastic materials such as metals are also contemplated and within the scope of the present disclosure. In some embodiments, the Young's modulus of the elastic material may be about 0.1 GPa to about 300 GPa, such as about 0.1 GPa, about 1 GPa, about 5 GPa, about 10 GPa, about 20 GPa, about 50 GPa, about 100 GPa, about 150 GPa, about 200 GPa, about 250 GPa, about 300 GPa, or any range or value contained therein.

The elastic material may include elastomers, thermoplastic elastomers, styrenic materials, olefinic materials, polyolefins, polyurethane thermoplastic elastomers, silicon-modified elastomers, polyamides, synthetic rubbers, rubber, PDMS, polybutadiene, polyisobutylene, poly(styrene-butadiene-styrene), polyurethane, polychloroprene, polyvinyl chloride, polyvinylidene chloride, silicon-containing polymers such as poly siloxanes such as poly(dimethylsiloxane) (that is, PDMS and h-PDMS), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, steel, titanium, zinc, iron, silver, gold, platinum, or combinations thereof. Any elastic material that can be shaped, molded, or otherwise designed to adopt the unit cell structure described herein may be utilized and is within the scope of this disclosure.

The number of unit cells in the structure is not particularly limited. For example, the structure may include a two-dimensional design having a plurality of unit cells, such as at least nine repeating unit cells arranged in a three-by-three pattern or at least twelve repeating units in a three-by-four pattern. The overall structure may be a square, for example at least sixteen repeating units in a four-by-four pattern, at least twenty-five repeating units in a five-by-five pattern, at least thirty-six units in a six-by-six pattern, or larger. The overall structure may be a rectangle, for example at least twenty repeating units in a four-by-five pattern, at least thirty repeating units in a five-by-six pattern, at least thirty-five repeating units in a five-by-seven pattern, or larger. In some embodiments, the structure may have unit cells arranged in a three-by-three pattern, a three-by-four pattern, a three-by-five pattern, a three-by-six pattern, a three-by-seven pattern, a three-by-eight pattern, a three-by-nine pattern, a three-by-ten pattern, a four-by-four pattern, a four-by-five pattern, a four-by-six pattern, a four-by-seven pattern, a four-by-eight pattern, a four-by-nine pattern, a four-by-ten pattern, a five-by-five pattern, a five-by-six pattern, a five-by-seven pattern, a five-by-eight pattern, a five-by-nine pattern, a five-by-ten pattern, a six-by-six pattern, a six-by-seven pattern, a six-by-eight pattern, a six-by-nine pattern, a six-by-ten pattern, a seven-by-seven pattern, a seven-by-eight pattern, a seven-by-nine pattern, a seven-by-ten pattern, an eight-by-eight pattern, an eight-by-nine pattern, an eight-by-ten pattern, a nine-by-nine pattern, a nine-by-ten pattern, or a ten-by-ten pattern. Larger configurations such as a twenty-by-twenty pattern, a fifty-by-fifty pattern, larger patterns, and any patterns within the aforementioned ranges are also contemplated. The maximum number of unit cells in the structure is limited only by the ability to produce a physical structure containing that number of unit cells.

In some embodiments, the structure may include a two-dimensional design in the shape of a sheet. In some embodiments, the structure may include a two-dimensional design that has been extruded outward to have depth as shown in FIGS. 5A-5B, which show a three-dimensional object that includes replicated unit cells in a specified configuration. FIG. 5A depicts a three-dimensional, ten-by-ten design, from a perspective view, according to an embodiment of the present disclosure. FIG. 5B is a top-down view of the three-dimensional, ten-by-ten design of FIG. 5A.

In some embodiments, the system includes two or more plates positioned to receive external vibrations, including those induced by an impulse from a shaker. The plates may be on any side of the structure, including on the top, the bottom, or both the top and the bottom of the structure. The plates may be in front of and in back of the structure, such that the fixed central points of the unit cells face the plates. The dimensions of the system can be adjusted to target specific frequency ranges. For example, scaling up the structure size (that is, increasing the size of the unit cells within the structure, without changing the number of unit cells in the structure) allows for effective operation at lower frequency ranges, without wishing to be bound by theory.

In some embodiments, a structure as shown in FIG. 5A may be manufactured using a 3D printer. FIG. 6 is an image of a 3D-printed version of a ten-by-ten design showing that the two-dimensional design may be extruded outward to have depth such that the rotational element forms a tube or column and the branches form sheets, according to some embodiments of the present disclosure. As used herein, "a two-dimensional design" refers to a design which has unit cells arranged in two dimensions, and "a three-dimensional design" refers to a design which has unit cells arranged in three dimensions. As shown in FIG. 6, the two-dimensional design may be extruded outward to form a three-dimensional structure, while the unit cells remain arranged in two dimensions.

The depth of the structure is not particularly limited. The depth of the structure may be roughly equivalent to a length or a height of the structure, or the depth may be, for example, up to about five times the length or height, up to about ten times the length or height, at least about five times the length or height, or at least about ten times the length or height.

The physical dimensions of the unit cell are not particularly limited. The size of the rotational element may be about 0.01 mm at its widest point, about 1 mm at its widest point, about mm at its widest point, about 100 mm at its widest point, about 1 cm at its widest point, about cm at its widest point, about 100 cm at its widest point, about 0.1 m at its widest point, about 1 m at its widest point, about 0.01 mm to about 1 m at its widest point, or any size which is encompassed by this range.

The length of the branches is not particularly limited. The length of the branches may be about 0.01 mm, about 1 mm, about 10 mm, about 100 mm, about 1 cm, about 10 cm, about 100 cm, about 0.1 m, about 1 m, about 0.01 mm to about 1 m, or any size which is encompassed by this range.

The ratio between the size of the rotational elements and the length of the branches may be about 1000:1, about 100:1, about 10:1, about 1:1, about 1:10, about 1:100, about 1:1000, about 1000:1 to about 1:1000, or any ratio encompassed by this range. For example, the ratio between the size of the rotational element and the length of the branches may be about 1:5, wherein the rotational element is about 10 mm at its widest point and the branches are about 50 mm in length. For example, the ratio between the size of the rotational element and the length of the branches may be about 10:1, wherein the size of the rotational element is about 100 mm and the length of the branches is about 10 mm. These examples are non-limiting and other sizes and ratios of sizes are possible and within the scope of the present disclosure.

The size of the structure is not particularly limited, and is dependent upon the number of unit cells within the structure and the size of the unit cells. As described herein, the unit cells may contain a rotational element and one or more branches which each independently range from about 0.1 mm to about 1 m. Accordingly, the structure may vary in size according to the size of the unit cells, and the size of the unit cells may be selected by a person having ordinary skill in the art based upon the application in which the structure is to be used. The size of the unit cells, and therefore the size of the structure, is limited only by the ability to produce a structure having unit cells of a particular size.

The method of producing of the structure for zero-frequency absorption of the present disclosure is not particularly limited, and the structure may be produced by any method known in the art. Methods of production of the structure having the unit cell structure of the present disclosure may include cutting a solid sheet of the material, creating the structure using a mold, extrusion, 3D printing, and other methods known to those skilled in the art.

Transmission loss simulations and vibration experiments were conducted to evaluate wave transmission through the structure. For example, when performing calculations on the structure of the present disclosure, a force is applied on one side of the structure and measured on the other. FIG. 7 shows the experimental setup for vibration measurements. The sample structure 201 is placed on the stage 202. The shaker 203 generates an excitation source from below the stage which contacts the bottom of the sample structure 201, and displacement is measured at the top of the sample structure 201. A laser scanning vibrometer 204 is configured to measure the wave transmission through the sample structure.

In some embodiments, the structure may further include solid pins which pass through the center of each unit cell, that is, through the fixed central point, which connect to solid plates on either side of the structure. FIG. 8 depicts a three-dimensional design having solid pins through each of the central points of the structure, according to some embodiments of the present disclosure. By incorporating these solid pins into the design, the system may achieve enhanced stability and structural integrity, enabling efficient absorption of vibrations within the zero-frequency range, without wishing to be bound by theory.

In some embodiments, the structure may further include solid plates which support the structure, and in some embodiments, connect the solid pins on either side of the structure. In FIG. 8, the two plates which connect to the pins are intended to minimize pin vibrations, which can be adjusted according to specific applications. In some embodiments, the strategic arrangement of the pins within the unit strengthens the overall system, effectively mitigating vibrations and disturbances encountered in various applications. The arrangement and configuration of the solid pins within the unit can be customized further based on desired performance objectives and the nature of the external vibrations to be addressed. This flexibility allows for optimization to maximize absorption capabilities, thereby minimizing the impact of vibrations on the surrounding environment.

The material of the solid pins is not particularly limited. In some embodiments, the solid pins are formed from the same or a different material as the structure. The solid pins may be made of metal, plastic, the like, or combinations thereof. It is contemplated that the solid pins can be formed from a material having a Young's modulus of about 3 GPa to about 300 GPa, such as about 5 GPa, about 10 GPa, about 20 GPa, about 50 GPa, about 100 GPa, about 150 GPa, about 200 GPa, about 250 GPa, about 300 GPa, about 350 GPa, about 400 GPa, about 450 GPa, about 500 GPa, or any range or value contained within a range formed within any of the preceding values. For example, the solid pins may be formed from rigid materials including but not limited to polyethylene terephthalate, polyvinyl chloride, polystyrene, acrylonitrile butadiene styrene, poly(methyl methacrylate) (PMMA), polyamide (PA), polyoxymethylene (POM), glass, fiberglass, sapphire, silicon, silicon carbide, carbon steel, steel, stainless steel, titanium, tungsten, aluminum, copper, brass, nickel, or combinations thereof. Without wishing to be bound by theory, the Young's modulus of the solid pins should be higher than the Young's modulus of the elastic material from which the unit cells are formed. The amount by which the Young's modulus of the elastic material and the solid pins differs is not particularly limited.

In some embodiments, the solid plates may be made from any material capable of providing support to the structure of the present disclosure, including metal, plastic, the like, or combinations thereof. The solid plates may be formed from the same or a different material from the solid pins, and may include polyethylene terephthalate, polyvinyl chloride, polystyrene, acrylonitrile butadiene styrene, poly(methyl methacrylate) (PMMA), polyamide (PA), polyoxymethylene (POM), glass, fiberglass, sapphire, silicon, silicon carbide, carbon steel, steel, stainless steel, titanium, tungsten, aluminum, copper, brass, nickel, or combinations thereof. In some embodiments, the Young's modulus of the solid plates is about 3 GPa to about 300 GPa, such as about 5 GPa, about 10 GPa, about 20 GPa, about 50 GPa, about 100 GPa, about 150 GPa, about 200 GPa, about 250 GPa, about 300 GPa, about 350 GPa, about 400 GPa, about 450 GPa, about 500 GPa, or any range or value contained within a range formed within any of the preceding values. Without wishing to be bound by theory, the Young's modulus of the solid plates should be higher than the Young's modulus of the elastic material from which the unit cells are formed. The amount by which the Young's modulus of the elastic material and the solid plates differs is not particularly limited.

FIG. 9 is a graph illustrating the performance of a zero-frequency absorber, according to embodiments of the present disclosure, with and without solid pins. FIG. 9 showcases a laboratory measurement that compares the performance of a zero-frequency structure with and without central pins. This evaluation provides valuable insights into the advantageous attributes of the present structure.

The measurement of the data shown in FIG. 9 uses a shaker and a laser vibrator. The shaker applies controlled vibrations to the structure, while the laser vibrator measures the structure's response, particularly from the opposing plate. The vibration velocity amplitude measured from the shaker serves as the normalization reference. This comprehensive testing methodology enables a precise evaluation of the structural dynamics and performance characteristics.

The measurement results reveal a significant difference between the zero-frequency structure with pins and a structure without pins. The zero-frequency structure with pins demonstrates superior vibration absorption capabilities within the low-frequency range below 100 Hz, effectively mitigating vibrations across a broad frequency spectrum. In contrast, the structure without pins exhibits lower effectiveness in attenuating vibrations.

This performance comparison underscores the unique benefits offered by the zero-frequency structure of the present disclosure, confirming its effectiveness in addressing vibration-related challenges. The comprehensive evaluation serves as empirical evidence supporting the practical application and advantages of the present design.

The provided laboratory measurement results are for illustrative purposes only and do not restrict the scope or application of the embodiments disclosed herein. Skilled artisans can explore other variations, adaptations, and configurations within the scope of the invention.

In some embodiments, the structure can include unit cells arranged in three dimensions, wherein the structure has a three-dimensional design. For example, the structure may include at least twenty-seven unit cells in a three-by-three pattern, at least one hundred twenty-five repeating unit cells in a five-by-five-by-five pattern, at least two hundred sixteen repeating unit cells in a six-by-six-by-six pattern, or larger, or any configuration contained within the preceding dimensions. FIG. 10 depicts a structure having a three-by-three-by-three design, according to embodiments of the present disclosure. In such a three-dimensional structure, the central point of each unit cell should be fixed, such that each unit cell can have rotational freedom of motion but not translational freedom of motion. The unit cells of the three-dimensional design can be any unit cell configuration as described herein. In some embodiments, the rotational element of the three-dimensional design can be a sphere or a cube, or a three-dimensional version of any shape as described herein. The fixed central point and branches may similarly be any shape or configuration as described herein. The size of the rotational element is not particularly limited and may be from about 0.1 mm to about 1 m or any range or value contained therein. The length of the branches is not particularly limited and may be from about 0.1 mm to about 1 m or any range or value contained therein. The ratio of the size of the rotational element to the length of the branches may be about 1000:1 to about 1:1000, or any range or value contained therein.

There is provided a structure for zero-frequency absorption which can include a unit cell formed from an elastic material, wherein the unit cell may include: a rotational element having a fixed central point and rotational freedom, and one or more branches connected to a tangent of the fixed central point and extending outward therefrom, wherein the unit cell repeats throughout the structure, and wherein the unit cell allows rotational movement of the fixed central points and prevents translational movement of the fixed central points.

In embodiments, the rotational element of the above embodiment may be a circle, an oval, a rectangle, or a triangle.

In embodiments, the fixed central point of any of the above embodiments may be a circle, an oval, a rectangle, or a triangle.

In embodiments, the one or more branches of any of the above embodiments are straight, curved, angled, or S-shaped.

In embodiments, the structure of any of the above embodiments includes at least nine unit cells arranged in a two-dimensional pattern.

In embodiments, the structure of any of the above embodiments includes at least twenty-five unit cells arranged in a two-dimensional pattern.

In embodiments, the structure of any of the above embodiments includes a plurality of unit cells, wherein the plurality of unit cells are arranged in a three-by-three or larger pattern.

In embodiments, the structure of any of the above embodiments includes a plurality of unit cells, wherein the plurality of unit cells are arranged in a five-by-five or larger pattern.

In embodiments, the structure of any of the above embodiments includes a plurality of unit cells, wherein the unit cells are arranged in a five-by-six or larger pattern.

In embodiments, the elastic material of any of the above embodiments includes polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

In embodiments, the rotational element of any of the above embodiments is about mm to about 1 m at its widest point.

In embodiments, the rotational element of any of the above embodiments is about mm to about 0.1 m at its widest point.

In embodiments, the rotational element of any of the above embodiments is about 1 mm to about 100 mm at its widest point.

In embodiments, the one or more branches of any of the above embodiments have a length of about 0.01 mm to about 1 m.

In embodiments, the one or more branches of any of the above embodiments have a length of about 0.1 mm to about 0.1 m.

In embodiments, the one or more branches of any of the above embodiments have a length of about 1 mm to about 100 mm.

There is provided a structure for zero-frequency absorption which includes a plurality of unit cells, each unit cell including a rotational element having a fixed central point and rotational freedom, and one or more branches connected to a tangent of the rotational element and extending outward therefrom, wherein the plurality of unit cells are connected by the one or more branches, and solid pins passing through the fixed central point of each of the plurality of unit cells.

In embodiments, the structure of the above embodiments further includes solid plates on either side of the structure which connect the solid pins.

In embodiments, the structure of any of the above embodiments is formed from polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

In embodiments, the solid pins of any of the above embodiments are formed from polyethylene terephthalate, polyvinyl chloride, polystyrene, acrylonitrile butadiene styrene, poly(methyl methacrylate) (PMMA), polyamide (PA), polyoxymethylene (POM), glass, fiberglass, sapphire, silicon, silicon carbide, carbon steel, steel, stainless steel, titanium, tungsten, aluminum, copper, brass, nickel, or combinations thereof.

The embodiments disclosed herein may be combined in any manner to form new embodiments.

EXAMPLES

Example 1

Using Finite Element Method (FEM) simulations with COMSOL software, a unit cell structure was developed to permit zero-frequency absorption. The unit cell is designed such that there is a fixed central point which is able to move rotationally, but not translationally, as shown in FIG. 1. The degree of rotation may be adjusted depending on the desired application. The structure was produced by 3D printing using flexible resin in a 10×10 pattern with dimensions of 79.04 mm depth by 86.944 mm width by 86.944 mm height, as shown in FIG. 6. In this example, the structure has unit cells arranged in a two-dimensional pattern extruded outward such that the structure has a depth. The structure was evaluated in transmission loss tests using the setup depicted in FIG. 7, wherein a sample of the structure was placed on a shaker which generates a vibration at the bottom of the sample. Transmission of the vibration was measured at the top of the sample.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is being used. For example, "about 50%" means in the range of 45% to 55% and also includes exactly 50%.

As used herein, the term "metamaterial" refers to any material which is engineered to have a property or properties that is not found in naturally occurring materials. Metamaterials may include repeating patterns or subunits or periodic structures. The shape, geometry, size, and arrangement of these patterns or subunits may allow metamaterials to exhibit the properties for which they are designed.

As used herein, the term "unit cell" refers to the most basic repeating unit that repeats throughout the structure of a material, as would be commonly understood by one of ordinary skill in the art.

As used herein, the terms "elastomer" and "elastic material" refer to materials that can stretch or deform and return to their original shape without substantial permanent deformation, and may comprise polymers, copolymers, monomer, composite materials, elemental materials, or combinations thereof, as would be commonly understood by one of ordinary skill in the art.

As used herein, the term "material" refers to the physical composition of an object or structure. For example, "material" may be used to describe physical compositions and elements that may be included in the makeup of a structure. For example, the "material" of a structure of the present disclosure may be an elastomer or flexible resin, or other elastic material.

As used herein, the term "Young's modulus" refers to the tensile or compressive stiffness of a material when a force is applied lengthwise relative to the material, wherein larger values indicate a stiffer material. Values for Young's modulus are in units of gigapascals (GPa) or megapascals (MPa) unless otherwise stated.

As used herein, the term "Poisson's ratio" refers to the ratio between the transverse strain and the axial strain as is commonly understood in the art.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 compounds refers to groups having 1, 2, or 3 compounds. Similarly, a group having 1-5 cells refers to groups having 1, 2, 3, 4, or 5 compounds, and so forth.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed is:

1. A structure for zero-frequency absorption comprising a unit cell formed from an elastic material, wherein the unit cell comprises:
    a rotational element having a fixed central point and rotational freedom; and
    one or more branches connected to a tangent of the rotational element and extending outward therefrom;
    wherein the unit cell repeats throughout the structure; and
    wherein the unit cell allows rotational movement of the rotational element and prevents translational movement of the rotational element.

2. The structure of claim 1, wherein the rotational element comprises a circle, an oval, a rectangle, or a triangle.

3. The structure of claim 1, wherein the fixed central point comprises a circle, an oval, a rectangle, or a triangle.

4. The structure of claim 1, wherein the one or more branches are straight, curved, angled, or S-shaped.

5. The structure of claim 1, wherein the structure comprises at least nine unit cells arranged in a two-dimensional pattern.

6. The structure of claim 1, wherein the structure comprises at least twenty-five unit cells arranged in a two-dimensional pattern.

7. The structure of claim 1, comprising a plurality of unit cells and wherein the plurality of unit cells are arranged in a three-by-three or larger pattern.

8. The structure of claim 1, comprising a plurality of unit cells and wherein the plurality of unit cells are arranged in a five-by-five or larger pattern.

9. The structure of claim 1, comprising a plurality of unit cells and wherein the plurality of unit cells are arranged in a five-by-six or larger pattern.

10. The structure of claim 1, wherein the elastic material comprises polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

11. The structure of claim 1, wherein the rotational element is 0.01 mm to 1 m at its widest point.

12. The structure of claim 1, wherein the rotational element is 0.1 mm to 0.1 m at its widest point.

13. The structure of claim 1, wherein the rotational element is 1 mm to 100 mm at its widest point.

14. The structure of claim 1, wherein the one or more branches have a length of 0.01 mm to 1 m.

15. The structure of claim 1, wherein the one or more branches have a length of 0.1 mm to m.

16. The structure of claim 1, wherein the one or more branches have a length of 1 mm to 100 mm.

17. A structure for zero-frequency absorption comprising:
    a plurality of unit cells, each unit cell comprising a rotational element having a fixed central point and rotational freedom, and one or more branches connected to a tangent of the rotational element and extending outward therefrom, wherein the plurality of unit cells are connected by the one or more branches; and
    solid pins passing through the fixed central point of each of the plurality of unit cells.

18. The structure of claim 17, further comprising solid plates on either side of the structure which connect the solid pins.

19. The structure of claim 17, wherein the structure is formed from polybutadiene, polyisobutylene, poly(styrene-butadiene-styrene), polyurethane, polychloroprene, polyvinyl chloride, polyvinylidene chloride, poly(dimethylsiloxane), poly(methylsiloxane), partially alkylated poly(methylsiloxane), poly(alkylmethylsiloxane), poly(phenylmethylsiloxane), polyisobutylenes, polychloroprene, silicone, rubber, neoprene, tetrafluoroethylene, fluoroelastomers, nylon, polyethylene, polypropylene, nitrile, perfluoroelastomers, poly-lactic acid, acrylonitrile butadiene styrene, polystyrene, aluminum, copper, brass, nickel, or combinations thereof.

20. The structure of claim 17, wherein the solid pins are formed from polyethylene terephthalate, polyvinyl chloride, polystyrene, acrylonitrile butadiene styrene, poly(methyl methacrylate) (PMMA), polyamide (PA), polyoxymethylene (POM), glass, fiberglass, sapphire, silicon, silicon carbide, carbon steel, steel, stainless steel, titanium, tungsten, aluminum, copper, brass, nickel, or combinations thereof.

* * * * *